Oct. 27, 1936.        C. J. HAGLIND        2,058,866
SLED STRUCTURE
Filed July 18, 1936

INVENTOR
CARL J. HAGLIND
BY
Brockett, Hyde, Higley & Meyer
ATTORNEYS

Patented Oct. 27, 1936

2,058,866

UNITED STATES PATENT OFFICE 2,058,866

SLED STRUCTURE

Carl J. Haglind, Cleveland, Ohio

Application July 18, 1936, Serial No. 91,258

5 Claims. (Cl. 280—23)

This invention relates to improvements in sled structure and more particularly to improvements in a push or sport sled.

An object of the present invention is to provide an improved structure for a push sled having long flexible runners adapted to be bent for steering the sled, with a passenger seat at the forward portion of the sled and upstanding handles for pushing and steering the sled from behind by a person positioned between the rear portion of the runners.

My invention provides a very strong but simple structure for such a sled and one which is cheaply manufactured. My invention also provides a very strong structure entirely of metal at the forward portion of the sled connected with the handles for steering purposes. My invention also comprises novel structure for supporting the passenger seat on the steerable portion of the sled.

Other novel features of my sled structure will be apparent from the accompanying drawing and description and the essential features will be summarized in the claims.

Figure 1:
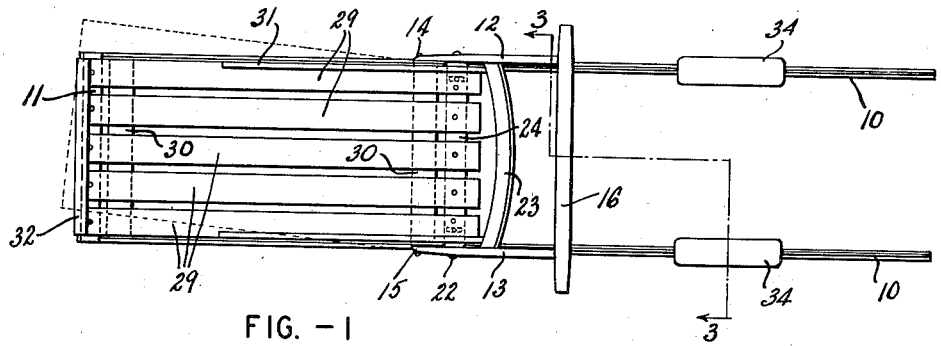
Figure 2:
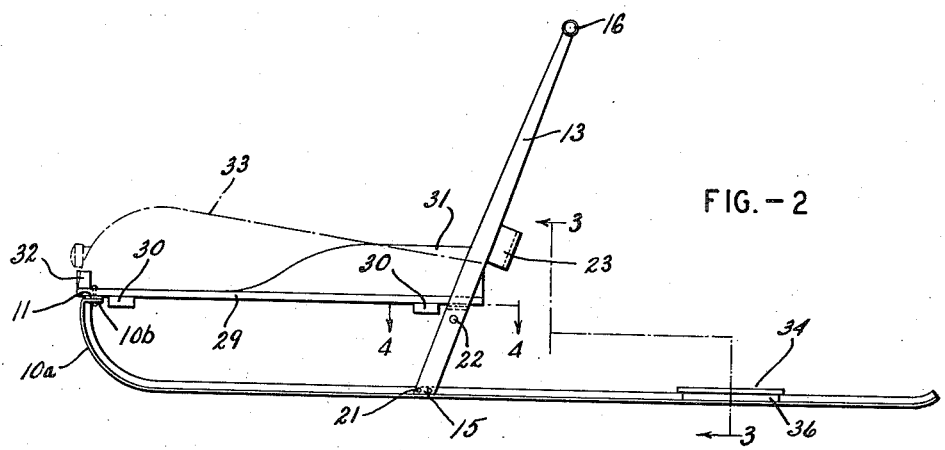
Figure 4:
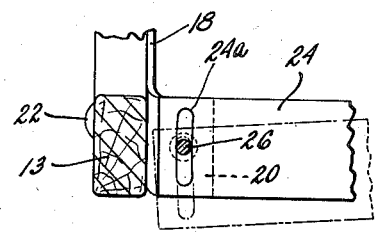
Figure 5:
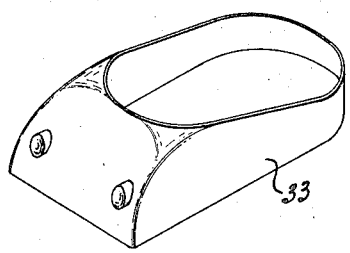
Figure 3:
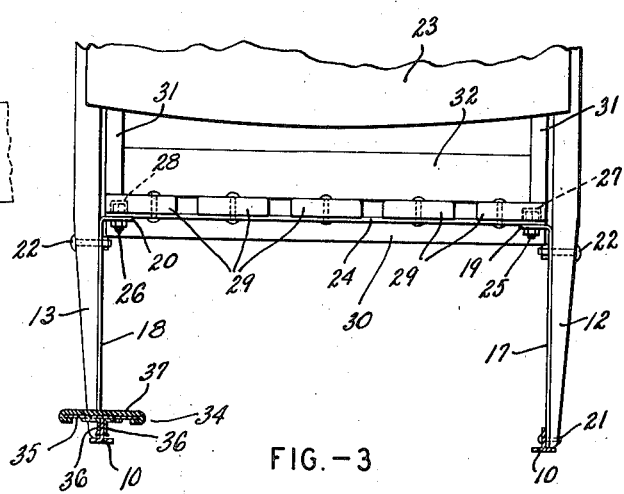

In the drawing, Fig. 1 is a top plan view of a sled embodying my invention; Fig. 2 is a side elevation of the sled of Fig. 1 with an alternative form of passenger body indicated in dot-dash lines; Fig. 3 is a partial sectional view along the lines 3—3 of Figs. 1 and 2; Fig. 4 is an enlarged detail view taken substantially along the line 4—4 of Fig. 2; while Fig. 5 is a perspective view of the alternative form of passenger body indicated in dot-dash lines in Fig. 2.

My improved sled comprises a pair of long flexible metallic runners 10 preferably of inverted T shape section as shown in Fig. 3. The forward ends of these runners are bent upwardly as at 10a and at the extremities tabs 10b are provided to which is rigidly secured as by rivets or other suitable means a front metallic cross-bar 11. A pair of upwardly extending steering handles 12 and 13 are provided, one for each runner. These handles are rigidly connected at 14 and 15 to an intermediate portion of the runners and equally spaced from the front end of the sled. The upper ends of the handles are connected by a handle bar 16 in position to be grasped by a person standing between the rear portions of the runners 10. Along the inner faces of the lower portions of the handles 12 and 13 extend metallic straps 17 and 18, at the upper ends of which are inwardly bent tabs 19 and 20. The straps 17 and 18 are secured at their lower ends by rivets or other suitable securing members 21 which serve the double purpose of securing each metallic strap to its handle and to secure the handle and strap to the adjacent runner. The upper ends of the straps 17 and 18 are secured to the handles by bolts or other suitable securing members 22. The straps 17 and 18 thus perform the double purpose of reinforcing the lower portions of the handles 12 and 13 and at the same time provide the tabs 19 and 20 for support of the passenger seat. Between the handles 12 and 13 at a point suitably spaced above the passenger seat level is a back members 23 which is properly secured to the side handles, for instance by a mortise and tenon joint.

A metallic strap 24 rests on the tabs 19 and 20 and forms the rear cross-bar for the passenger seat support. A pin and slot connection is provided at each of these points so as to permit relative movement between the cross-bar 24 and the tabs 19 and 20 in a direction longitudinally of the sled. Since the construction is the same at each of these points one only will be described as best seen in Figs. 3 and 4. A bolt 26 extends through a circular hole in tab 20 and through a slot 24a in the rear cross-bar 24. This slot extends generally longitudinally of the sled and preferably is slightly arcuate in form with the ends thereof bent inwardly. The head of bolt 26 rests on the upper face of bar 24 and moves in an elongated trough 28 which is in the lower face of the passenger seat and registers with the slot 24a. The bolt 25 on the opposite side of the sled is arranged in a manner similar to bolt 26.

Supported on the front cross-bar 11 and the rear cross-bar 24 is a suitable passenger platform or seat of substantially rigid construction. In the form shown in Figs. 1 to 4, top boards 29 are rigidly secured together by bolsters or benches 30 and may be provided with side boards 31 and a toe board 32. The top boards are rigidly secured to the cross bars 11 and 24 by suitable securing means, such as bolts or rivets. The elongated troughs 27 and 28 are in the lower faces of the side top boards 29.

Other suitable forms of passenger seat structure may be used in place of that described. For instance, a streamline body 33 such as that illustrated in Fig. 5 might be placed upon the top boards 29 or with slight modifications might be supported directly upon the cross bars 11 and 24.

I prefer to attach foot rests 34 to the runners 10 to the rear of the handle 16. A suitable structure for this purpose is shown on the left hand runner in Fig. 3 where a metallic plate 35 is welded to a pair of angle brackets 36 which in turn are clampingly secured to the upstanding arm of the runner 10. To the plate 35 is preferably vulcanized a rubber tread 37.

In use the operator standing between the rear portion of the runners 10 pushes the sled by grasping the handle bar 16. The sled is steered by twisting the handle bar so as to flex the front portion of the runners to the right as shown in Fig. 1 in dotted lines or to the left. The structure I have shown is ideal for this purpose because the metallic straps 17 and 18 are held in parallel alinement by the cross-bar 24 and in turn are rigidly connected with the handles 12 and 13 and with the runners 10. In addition to this, the runners at their forward ends are rigidly connected by the metallic cross bar 11 so that the whole forward end of the sled is twisted as a unit by this metallic framework. At the same time the passenger seat or platform is permitted to move with respect to the handles and the runners because of the pin and slot connection between the seat platform and the tabs 19 and 20.

What I claim is:

1. In a sled of the class described, a pair of long flexible metallic runners bent upwardly at their forward ends, a front metallic cross-bar rigidly connecting said forward ends of said runners, a pair of upwardly extending handles one for each runner, said handles being rigidly connected at their lower ends to their respective runners at points equidistant from the front ends of said runners, a handle bar connecting the upper portions of said handles, a metallic strap along the lower portion of each of said handles and secured thereto and to the associated runner, a rear metallic cross-bar secured between said straps to hold said runners substantially parallel, a substantially rigid platform rigidly secured to said cross-bars and having a bolt and slot connection with said straps, and said connection being arranged to permit relative movement between the connected parts longitudinally of said sled.

2. In a sled of the class described, a pair of long flexible metallic runners bent upwardly at their forward ends, a front metallic cross-bar rigidly connecting said forward ends of said runners, a pair of upwardly extending handles one for each runner, said handles being rigidly connected at their lower ends to their respective runners at points equidistant from the front ends of said runners, a handle bar connecting the upper portions of said handles, a metallic strap along the lower inside face of each of said handles and secured thereto and to the associated runner, each of said straps having an inwardly extending tab, a rear metallic cross-bar secured between said tabs to hold said runners substantially parallel, a substantially rigid platform rigidly secured to said cross-bars, said rear cross-bar having a bolt and slot connection with said tabs, and said connection being arranged to permit relative movement between the connected parts longitudinally of said sled.

3. In a sled of the class described, a pair of long flexible metallic runners bent upwardly at their forward ends, a front metallic cross-bar rigidly connecting said forward ends of said runners, a pair of upwardly extending handles one for each runner, said handles being rigidly connected at their lower ends to their respective runners at points equidistant from the front ends of said runners, a handle bar connecting the upper portions of said handles, a metallic strap along the lower inside face of each of said handles and secured thereto and to the associated runner, each of said straps having an inwardly extending tab, a rear metallic cross-bar secured between said tabs to hold said runners substantially parallel, there being a slot in each end of said rear cross-bar opposite each tab, said slots extending generally longitudinally of said sled, a bolt extending through each tab and through the associated slot in the rear cross-bar, and a substantially rigid platform rigidly secured to both of said cross-bars and having elongated troughs in its lower face registering with the slots in said rear cross-bar to receive the heads of said bolts.

4. In a sled of the class described, a pair of long flexible metallic runners bent upwardly at their forward ends, a front metallic cross-bar rigidly connecting said forward ends of said runners, a pair of upwardly extending handles one for each runner, said handles being rigidly connected at their lower ends to their respective runners at points equidistant from the front ends of said runners, a handle bar connecting the upper portions of said handles, a metallic strap along the lower inside face of each of said handles and secured thereto and to the associated runner, each of said straps having an inwardly extending tab, a rear metallic cross-bar secured between said tabs to hold said runners substantially parallel, a substantially rigid platform rigidly secured to said cross-bars, said rear cross-bar having a bolt and slot connection with said tabs, said connection being arranged to permit relative movement between the connected parts longitudinally of said sled, a seat back rest between said handles above said platform, a toe board at the front of said platform, and a foot rest on each runner to the rear of said handles.

5. In a sled of the class described, a pair of long flexible metallic runners bent upwardly at their forward ends, said runners being inverted T-shape in section, a front metallic cross-bar rigidly connecting said forward ends of said runners, a pair of upwardly extending handles one for each runner, said handles being rigidly connected at their lower ends to their respective runners at points equidistant from the front ends of said runners, a handle bar connecting the upper portions of said handles, a metallic strap along the lower inside face of each of said handles and secured thereto and to the upstanding flange of the associated runner, each of said straps having an inwardly extending tab, a rear metallic cross-bar secured between said tabs to hold said runners substantially parallel, there being a slot in each end of said rear cross-bar opposite each tab, said slots extending generally longitudinally of said sled, a bolt extending through each tab and through the associated slot in the rear cross-bar, a substantially rigid platform rigidly secured to both of said cross-bars and having elongated troughs in its lower face registering with the slots in said rear cross-bar to receive the heads of said bolts, a seat back rest secured to said handles above said platform, and a foot-rest secured to the upstanding flange of each runner to the rear of said handles.

CARL J. HAGLIND.